(12) United States Patent
Böhm et al.

(10) Patent No.: US 9,764,650 B2
(45) Date of Patent: Sep. 19, 2017

(54) DC CHARGING STATION FOR A BATTERY OF AN ELECTRIC VEHICLE

(75) Inventors: Markus Böhm, Möhrendorf (DE); Nicholas Demetris Cherouvim, Nürnberg (DE); Johannes Reinschke, Nürnberg (DE); Johnannes Starkl, Wildenranna (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 721 days.

(21) Appl. No.: 13/825,959

(22) PCT Filed: Aug. 31, 2011

(86) PCT No.: PCT/EP2011/065022
§ 371 (c)(1),
(2), (4) Date: Jun. 12, 2013

(87) PCT Pub. No.: WO2012/038222
PCT Pub. Date: Mar. 29, 2012

(65) Prior Publication Data
US 2013/0249485 A1 Sep. 26, 2013

(30) Foreign Application Priority Data
Sep. 23, 2010 (DE) .......... 10 2010 041 253

(51) Int. Cl.
*B60L 11/18* (2006.01)
*H02J 7/00* (2006.01)
(Continued)

(52) U.S. Cl.
CPC ......... *B60L 11/1811* (2013.01); *B60L 11/185* (2013.01); *H02J 7/007* (2013.01);
(Continued)

(58) Field of Classification Search
CPC ............. B60L 2230/10; B60L 11/1838; Y02T 90/128; Y02T 90/127
See application file for complete search history.

(56) References Cited

U.S. PATENT DOCUMENTS 5,179,335 A * 1/1993 Nor ............... 320/159
5,202,617 A * 4/1993 Nor ............... 320/130
(Continued)

FOREIGN PATENT DOCUMENTS

DE       692 18 450 T2    6/1997
DE   10 2006 039 417 A1    3/2008
(Continued)

OTHER PUBLICATIONS

Office Action issued Sep. 2, 2014 in corresponding Chinese Patent Application No. 201180045812.2 with partial German translation.
(Continued)

*Primary Examiner* — Samuel Berhanu
*Assistant Examiner* — Tarikh Rankine
(74) *Attorney, Agent, or Firm* — Slayden Grubert Beard PLLC

(57) ABSTRACT

A DC voltage source, for example an AC/DC converter, has an output producing a controllable DC voltage for a DC charging station to charge the battery of an electric vehicle. A voltage balancing unit is connected between the output of the converter and the output terminal of the DC charging station. The voltage balancing unit has a controllable switch by which the connection between voltage source or converter and battery can be made or broken as desired. The switch is controlled as a function of the voltage on the input and output side of the voltage balancing unit to the effect that the switch breaks the connection before and while the battery is being connected to the DC output terminal, and makes a connection only when the voltage on the input side
(Continued)

of the voltage balancing unit corresponds substantially to the voltage on the output side of the voltage balancing unit.

15 Claims, 3 Drawing Sheets

(51) Int. Cl.
*H02J 7/04* (2006.01)
*H02H 11/00* (2006.01)

(52) U.S. Cl.
CPC ......... *H02J 7/0036* (2013.01); *B60L 11/1809* (2013.01); *B60L 2270/20* (2013.01); *H02H 11/00* (2013.01); *H02J 7/0027* (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | | |
|---|---|---|---|---|
| 5,530,337 | A * | 6/1996 | Yamamoto | H02J 7/0045 320/138 |
| 5,644,211 | A | 7/1997 | Tokuyama | |
| 6,066,939 | A | 5/2000 | Nagai et al. | |
| 6,323,623 | B1 * | 11/2001 | Someya et al. | 320/166 |
| 9,088,178 | B2 * | 7/2015 | Adest | H02J 1/102 307/43 |
| 2003/0218388 | A1 * | 11/2003 | Lohmueller | H03K 17/163 307/125 |
| 2004/0169489 | A1 * | 9/2004 | Hobbs | 320/104 |
| 2005/0174098 | A1 * | 8/2005 | Watanabe et al. | 323/282 |
| 2008/0053716 | A1 * | 3/2008 | Scheucher | B60L 11/1861 180/2.1 |
| 2008/0100258 | A1 * | 5/2008 | Ward | H01M 10/465 320/101 |
| 2008/0278123 | A1 * | 11/2008 | Mehas | H02M 3/1588 323/266 |
| 2009/0189572 | A1 | 7/2009 | Kamatani | |
| 2009/0218988 | A1 | 9/2009 | Richardson et al. | |
| 2009/0251100 | A1 * | 10/2009 | Incledon | H02J 7/0026 320/106 |
| 2010/0174667 | A1 | 7/2010 | Vitale et al. | |
| 2010/0191373 | A1 | 7/2010 | Kim et al. | |
| 2010/0238020 | A1 * | 9/2010 | Pellen | 340/533 |

FOREIGN PATENT DOCUMENTS

| | | |
|---|---|---|
| EP | 0 574 753 A2 | 5/1993 |
| JP | 11-4548 | 1/1999 |

OTHER PUBLICATIONS

English translation of Search Report for corresponding Chinese Patent Application No. 201180045812.2.
German Office Action for 10 2010 041.253.8; mailed Aug. 3, 2011.
International Search Report for PCT/EP2011/065022; mailed Oct. 12, 2012.
Application No. 102010041253.8, filed Sep. 23, 2010, Markus Böhm et al., Siemens Aktiengesellschaft.

* cited by examiner

DC CHARGING STATION FOR A BATTERY OF AN ELECTRIC VEHICLE

CROSS REFERENCE TO RELATED APPLICATIONS

This application is the U.S. national stage of International Application No. PCT/EP2011/065022, filed Aug. 31, 2011 and claims the benefit thereof. The International Application claims the benefit of German Application No. 102010041253.8 filed on Sep. 23, 2010, both applications are incorporated by reference herein in their entirety.

BACKGROUND

Generally a DC voltage or a DC current is needed for charging a battery. A charging station for a battery of an electric vehicle is as a rule connected to a 3-phase AC mains connection, so that an AC/DC conversion initially has to be performed. In such cases the conventional choice is not to perform the conversion in the electric vehicle but in the charging station, in order to avoid the electric vehicle itself having to be equipped with an alternating current-direct current converter (AC-DC converter).

A corresponding DC charging station for electric vehicles generally has at least one 3-phase AC mains connection, an input filter and an isolating transformer, an AC-DC converter and also a battery connection.

The AC-DC converter, especially when the charging station is to be used both for charging and for discharging a battery, is a controlled converter. 6-pulse or 12-pulse thyristor bridges or what are known as IGBT bridges ("insulated-gate bipolar transistor" or bipolar transistor with insulated gate electrode), which are typically operated with a clock rate in the kHz range can for example be used as forms in which such a converter can be realized.

In order to reduce so-called "ripple" on DC current and DC voltage at the output of the converter, especially in the case of thyristor bridges, an output filter in the form of a passive electrical network is frequently connected between converter and battery.

FIG. 1 shows a known circuit diagram of a DC charging station with a 3-phase mains connection 1, an input filter 2, an isolating transformer 3, an AC-DC converter 4, an output filter 5, and also a battery connection 6, via which the battery to be charged 7 can be connected to the charging station. The fuses on the input and output side of the converter 4 not identified by any reference number in FIG. 1 are typically present for the protection of the converter 4.

If the battery 7 were to be permanently connected to the output filter 5, i.e. hard wired, and not able to be connected or disconnected by a plug, the output-side circuitry of the AC/DC converter 4 would be unproblematic. Such a case is for example presented in U.S. 2010/0019737 A1. But since the battery 7 in the case of an electric vehicle is sensibly connected via an electric coupling 6, for example a plug connection, to the output terminals of the output filter 5 of the DC charging station, problems arise if, when the coupling or connection is made, the battery voltage U2 and the output voltage U1 of the charging station, i.e. the output voltage of the output filter 5, differ. In this case, when the connection between battery 7 and charging station is made via the components of the output filter 5, a battery charging or discharging current can flow, the maximum amount of which can amount to a multiple of the maximum permissible charging or discharging current and which can therefore lead to damage to all electric components through which current flows, even to destruction of the battery 7.

The problem described can in principle typically be avoided or at least ameliorated with the aid of the following measures:

(i) Dispensing with the output filter: this variant is principally conceivable with sufficiently rapidly-clocked and regulated IGBT converters, however at the expense of a greater current ripple on the battery charging or discharging current compared to the embodiment with output filter. This higher ripple can reduce the battery life. Furthermore faster clocking of the converter leads to higher losses in the converters. The aim is therefore, as regards energy efficiency, to make the clock frequencies as small as possible and the regulation times as large as possible. It is not conceivable to dispense with the output filter in the case of thyristor bridge converters. The resulting ripple of the battery charging or discharging current would be unacceptably large.

(ii) Expansion of the LC output filter by a resistor, which is connected in series with the capacitor C. This represents a current-limiting measure for the battery charging or discharging current, which is produced as a result of an initial voltage difference between U1 and U2. This measure however has the effect of making the effectiveness of the output filter worse. Furthermore such a resistor represents an additional loss source during the charging or discharging process, associated with a deterioration in the efficiency of the charging station.

(iii) Insertion of a diode 5 between output filter 5 and battery terminals 6. According to the related art (see for example the Chademo standard), this diode is inserted into the plus line and is referred to as the reverse current diode. Such a diode prevents a change in direction of the current flow and limits the integral of current multiplied by time to the maximum charge of the capacitor in the output filter 5. The disadvantages of a reverse current diode are:

(a) The reverse current diode is an additional source of losses, wherein the loss power is equal to the charge current times the voltage drop of typically 0.9 V to 1.5 V over the reverse current diode.

(b) A charging station with reverse current diode is not capable of feeding back, i.e. with such a charging station the battery can only be charged, but not discharged.

SUMMARY

Described below are a DC charging station and a sequence of a corresponding charging process which avoids the stated disadvantages and especially the above-mentioned problems of the uncontrolled and possibly too high battery charging current or discharging current at the beginning of the charging process.

When a non-controllable or regulatable passive electrical network is used at the output of the AC-DC converter of the DC charging station, a voltage balance between output voltage U1 of the DC charging station and the battery voltage U2 is required before the battery can be connected.

The DC charging station described below for charging the battery, in particular of an electric vehicle, has the following features:

A DC voltage source with an output at which, at least in the operating state of the DC charging station, a DC voltage is available, A DC output terminal to which the battery to be charged is able to be connected and which is able to be connected to the DC voltage source for charging the battery via at least one line, A voltage balancing unit, which is connected between the output of the DC voltage source and the DC output terminal of the DC charging station and which has a controllable first switch which is able to be controlled such that it can optionally make or break a connection between the output of the DC voltage source and the DC output terminal of the DC charging station, A first voltage detection unit, which detects the input-side voltage (U1) of the voltage balancing unit, A second voltage detection unit, which detects the output-side voltage (U2) of the voltage balancing unit, An open-loop and closed-loop control unit for control and regulation of the voltage balancing unit, to which the measured values (U1, U2) detected with the first and the second voltage detection unit are supplied, wherein the open-loop and closed-loop control unit is configured to control the first switch to the effect that it breaks the connection before and while the battery is connected to the DC output terminal, and at least for a battery connected to the DC output terminal, makes a connection if the input-side voltage (U1) of the voltage balancing unit corresponds substantially to the output-side voltage (U2) of the voltage balancing unit.

The DC voltage source is a regulatable, especially a voltage-regulatable voltage source, wherein an open-loop and closed-loop control unit for control and regulation of the DC voltage source is provided, which is configured to regulate the DC voltage source at least in the operating state and at least for the battery connected to the DC output terminal to the effect that the input-side voltage (U1) of the voltage balancing unit corresponds substantially to the output-side voltage (U2).

In this case the open-loop and closed-loop control of the DC-voltage source is implemented as cascaded voltage and current regulation, in which the current regulator forms an inner regulation circuit and the voltage regulator an outer regulation circuit.

The voltage balancing unit has a resistor, especially a shunt, via which the input-side voltage (U1) is measured and which is connected when the voltage balancing unit carries out the voltage balancing.

The resistor is especially connected in parallel to the first voltage detection unit when the first switch is in an open state.

The resistor is switched off especially when the input-side voltage (U1) of the voltage balancing unit corresponds substantially to the output-side voltage (U2) of the voltage balancing unit.

A second switch is provided for the resistor which is connected in series with the resistor and is coupled in opposition to the first switch for the line.

Insulation monitoring can be provided at the output of the voltage balancing unit, with which damage to the charging cable and/or damage to the charging socket on the vehicle and/or damage to the electrical connection to the battery in the vehicle is able to be detected.

The DC voltage source is advantageously an AC-DC converter, to the input of which an AC voltage is able to be applied at least in the operating state of the DC charging station, which is converted into the DC voltage available at its output in the operating state.

An output filter, especially a lowpass filter, can be connected between the DC output and the DC voltage source and the voltage balancing unit, which can for example be embodied as an LC filter or as an LC-T filter. The first voltage detection unit then detects the voltage (U1) at the output of the output filter.

In the method for charging a battery described below, especially of an electric vehicle, a DC charging station is used with a DC voltage source, which makes a DC voltage available at least in the operating state of the DC charging station, a DC output terminal, to which the battery to be charged is able to be connected and which is able to be connected for charging the battery via at least one line to the DC voltage source, a voltage balancing unit, which is connected between the output of the DC voltage source and the DC output terminal of the DC charging station and which has a controllable first switch which is able to be controlled such that it can optionally make or break a connection between the output of the DC voltage source and the DC output terminal of the DC charging station, wherein the connection is broken before and while a battery is connected to the DC output terminal of the DC charging station.

In this method the input-side voltage (U1) and the output-side voltage (U2) of the voltage balancing unit are detected after a battery to be charged has been connected to the DC output terminal. The connection between the output of the DC voltage source and the DC output terminal of the DC charging station is only made when the input-side voltage (U1) of the voltage balancing unit corresponds substantially to the output-side voltage (U2) of the voltage balancing unit.

The DC voltage source is a regulatable, especially a voltage-regulatable voltage source. The DC voltage source is regulated, at least in the operating state of the DC charging station, at least for the battery connected to the DC output terminal such that the input-side voltage (U1) of the voltage balancing unit corresponds substantially to the output-side voltage (U2).

The following is included in the method:

1) The connection between the output of the DC voltage source and the DC output terminal of the DC charging station is initially broken before the connection of the battery to the charging station, by the first switch initially being opened for example before the connection of the battery to the charging station;

2) After an electrical connection has been made between the charging station and the battery, the output-side voltage (U2) of the voltage balancing unit is determined;

3) The input-side voltage (U1) of the voltage balancing unit is determined;

4) The DC voltage source, especially the DC voltage available at the output of the DC voltage source, is regulated to the extent that the input-side voltage (U1) of the voltage balancing unit and the output-side voltage (U2) of the voltage balancing unit substantially correspond;

5) The connection between the output of the DC voltage source and the DC output terminal of the DC charging station is made, by the first switch being closed for example;

6) The charging or discharging current is ramped up to a nominal value.

Advantageously there is a short waiting period in (5a) after (5) and before the execution of (6).

The input-side voltage (U1) is measured via a resistor (R), which, for measurement purposes, is able to be connected and disconnected with the aid of a second switch. The resistor is connected, in (3a) before the execution of (4), especially by closing the second switch.

Advantageously in (5b) after (5) or after (5a) and before the execution of (6), the resistor is disconnected, especially by opening the second switch.

Advantageously there is a short waiting period in (5c) after (5b) and before the execution of (6).

BRIEF DESCRIPTION OF THE DRAWINGS

Further advantages, features and details emerge from the exemplary embodiments described below and also with reference to the drawings, in which.

DETAILED DESCRIPTION OF THE PREFERRED EMBODIMENT

Figure 1:
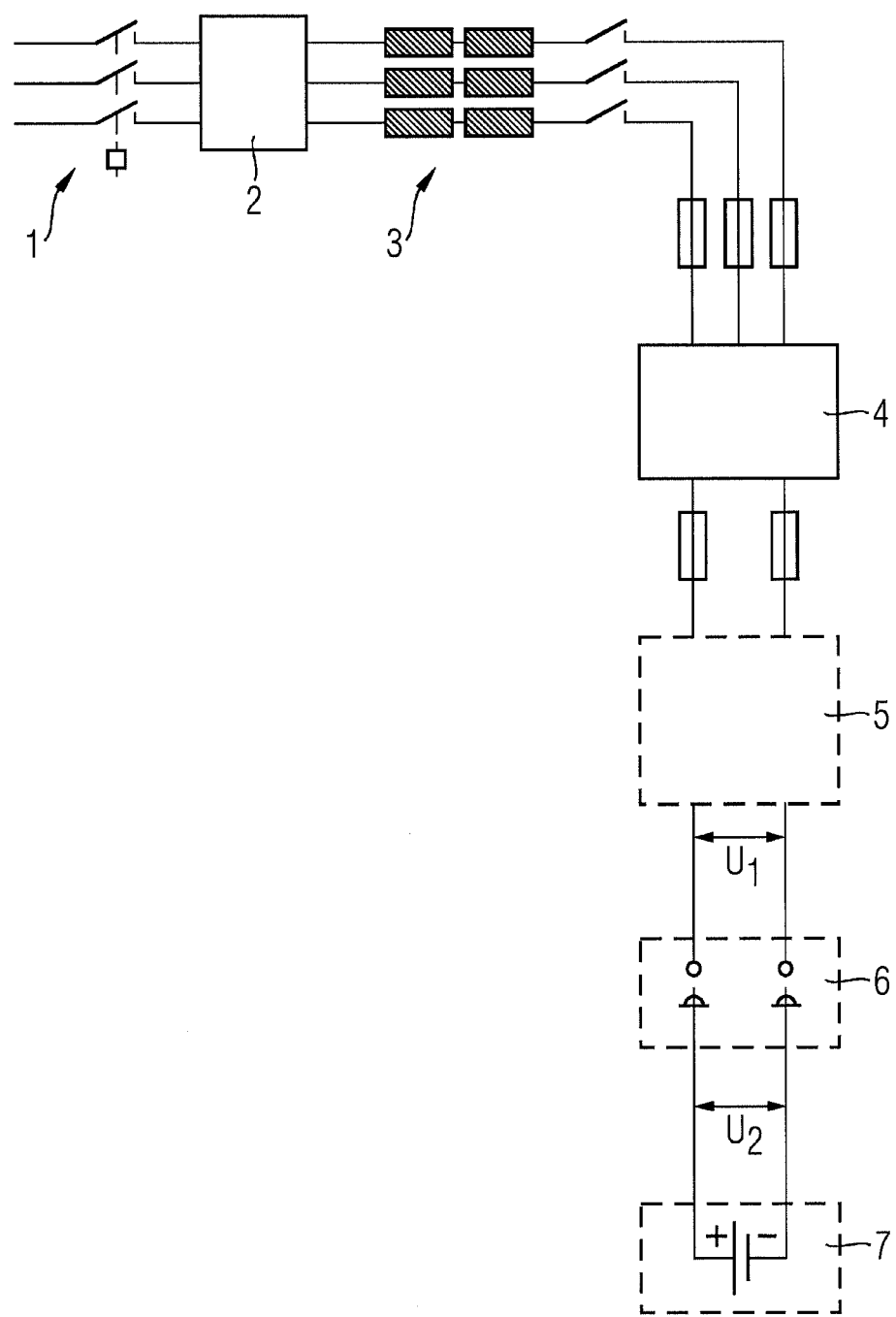
FIG. 1 shows a circuit diagram of a known DC charging station.

Reference will now be made in detail to the preferred embodiments, examples of which are illustrated in the accompanying drawings, wherein like reference numerals refer to like elements throughout.

As described above, FIG. 1 shows the circuit diagram of a known DC charging station with the disadvantages which have been explained.

Figure 2:
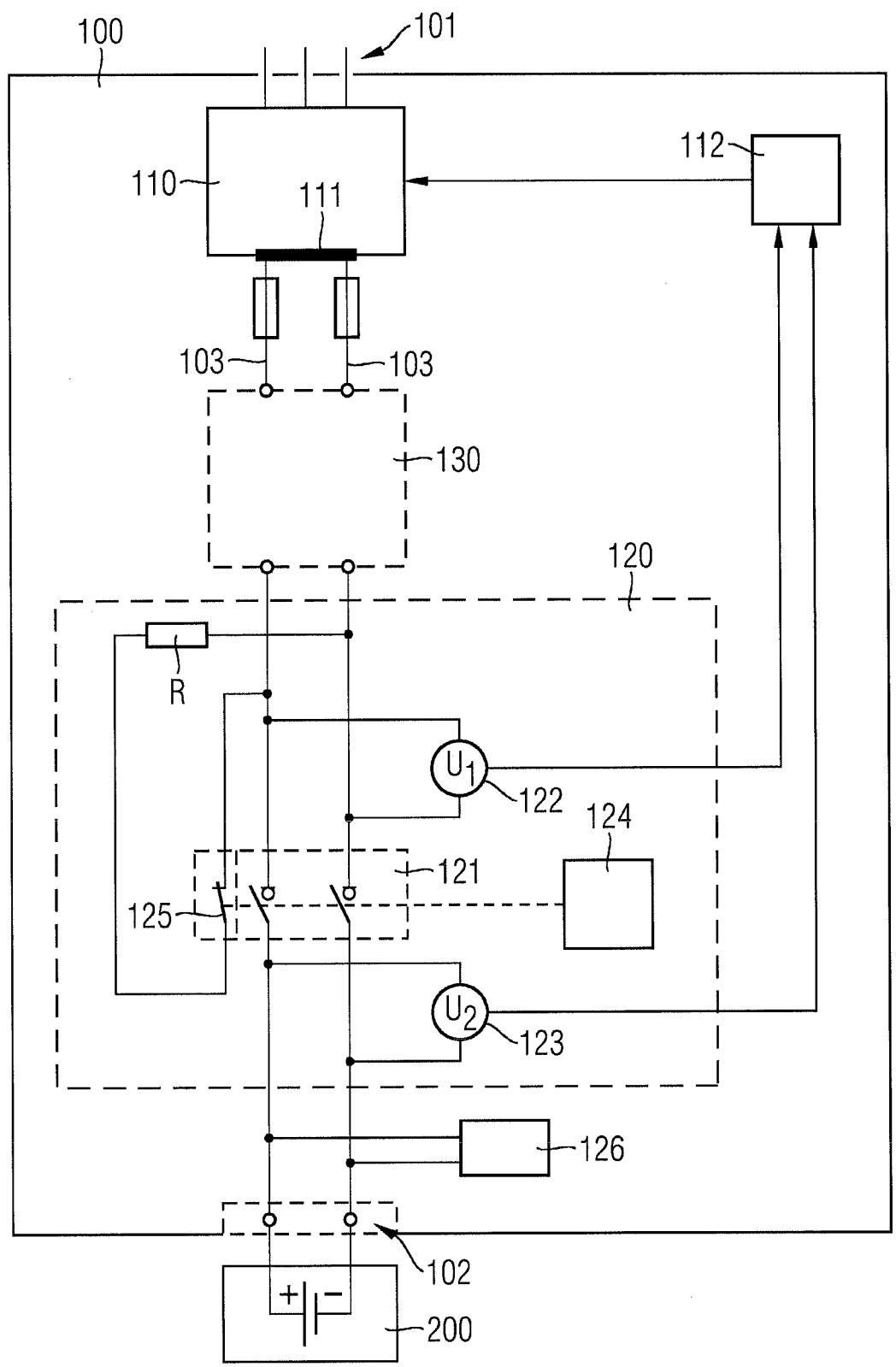
FIG. 2 shows a circuit diagram of a DC charging station.

FIG. 2 shows the circuit diagram of a DC charging station 100 for a battery 200 of an electric vehicle for example. For reasons of clarity neither the electric vehicle itself nor the components of the AC voltage supply of the charging station 100 shown in FIG. 1 are shown in detail, but only an AC input terminal 101 of the DC charging station which, as indicated in FIG. 1, is able to be connected for example to a 3-phase power supply network, and also the battery 200 of the electric vehicle, which is connected to a DC output terminal 102 of the DC charging station 100. The output terminal 102 is in practice ultimately a charging cable with a plug, which is able to be plugged into the corresponding socket of the electric vehicle and thus is able to be connected to the battery 200.

The DC charging station 100 has a DC voltage source 110 which makes a DC voltage available, with which the battery 200 is ultimately charged. The DC voltage source 110 is embodied as an AC-DC converter 110, which converts the alternating current $U_{AC}$ present at the AC input terminal 101 of the charging station 100 in a known way into a direct current $U_{DC}$. The direct current $U_{DC}$ is available as a DC output 111 of the AC-DC converter 110. The DC output 111 is connected via corresponding lines 103 to the DC output terminal 102 of the charging station 100.

The AC-DC converter 110 is able to be operated on the output side, i.e. on the DC side, with the aid of an open-loop and closed-loop control unit 112, both as a voltage-regulated and also current-regulated converter. The open-loop and closed-loop control unit 112 is embodied for example to set the output current $U_{DC}$ as a function of specific conditions. These are explained in greater detail below.

The DC charging station 100 further contains a DC-DC coupling 120, which will be referred to below as the voltage balancing unit and which is connected between the AC-DC converter 110 and the DC output terminal or the battery terminal 102. The voltage balancing unit 120 has an externally controllable switch 121, which can optionally respectively break or open or make or close at least one, but as shown in FIG. 2, both lines 103 of the DC terminal of the DC charging station 100 between the DC output 111 of the AC-DC converter 110 and the DC output terminal 102.

The externally controllable switch 121 of the voltage balancing unit 120 can be realized for example as a mechanical switch, load isolator or contactor. Power electronics realization forms are naturally also conceivable.

The voltage balancing unit 120 also has a first voltage detection unit 122, which detects the input-side voltage U1 of the voltage balancing unit 120, and also a second voltage detection unit 123, which detects the output-side voltage U2 of the voltage balancing unit. In such cases the output-side voltage U2 corresponds to the battery voltage $U_{Batt}$, provided the electrical connection to the vehicle is made and in the vehicle the battery is electrically connected to the charging socket of the vehicle.

The measured voltage values U1, U2 detected with the voltage detection units 122, 123 are transferred to the open-loop and closed-loop control unit 112, which sends a nominal value signal to a switch drive 124 of the voltage balancing unit 120, wherein the switch drive 124 actuates the switch 121.

The voltage balancing unit 120 is now operated the aid of the open-loop and closed-loop control unit 112 so that the switch 121 basically remains in an open state before and while the battery 200 is connected. Thus the battery 200 is also decoupled during the connection of the DC voltage source 110.

After the battery 200 has been connected to the DC output terminal 102 of the DC charging station 100, the battery voltage $U_{Batt}$=U2 is measured by the output-side voltage detection unit 123 of the voltage balancing unit 120 and initially checked for plausibility. If the battery voltage is not in a nominal range between $U_{Batt,min}$ and $U_{Batt,max}$ or if the measured battery voltage even has its leading sign inverted, the charging station outputs an error message and the preparation of the charging process is aborted. After a successful plausibility check of the battery voltage $U_{Batt}$=U2, U2 is compared with the input-side voltage U1. At the same time the AC-DC converter 110 is operated voltage-regulated with the aid of its open-loop and closed-loop control unit 112 so that the voltage U1 at the input of the voltage balancing unit 120 corresponds substantially to the voltage U2 at the output of the voltage balancing unit 120. In such cases the term "substantially" is to be understood as the voltages U1, U2 matching within the framework of a measurement accuracy or in a range of for example around 1-10%. Only thereafter is the switch 121 closed with the aid of the switch drive 124 in the voltage balancing unit 120 and thus the charging or discharging process of the battery 200 made possible.

An output filter 130 can be connected downstream from the AC-DC converter 110, which is thus located between the DC output 111 of the AC-DC converter 110 and the voltage balancing unit 120. The filter 130 can especially be embodied as a lowpass filter, for example as an LC filter or, as shown in FIG. 1, as an LC-T filter with a capacitor C and two inductors L1, L2, so that, as mentioned at the start, it limits the "ripple" on the DC current or the DC voltage $U_{DC}$ at the DC output 111 of the converter 110. In this case the first voltage detection unit 122, which measures the voltage U1, determines the voltage at the output of the output filter 130 of the DC charging station 100.

In summary and in other words the switch 121 is only closed and thus the AC-DC converter 110 is only electrically connected to the DC output terminal 102 of the DC charging station 100, if on the one hand a battery 200 is connected to the output terminal 102 and on the other hand the output voltage U1 of the AC-DC converter 110 or—if present—of the output filter 130 corresponds to the output voltage U2. In order to fulfill condition U1=U2, the AC-DC converter 110 will be regulated with the aid of its open-loop and closed-loop control unit 112 as a function of the measured voltages U1 and U2 to the extent that the voltage U1 corresponds to the voltage U2. Only if the open-loop and closed-loop control unit 112 detects that voltage balancing has taken place, does the switch drive 124 receive the signal to close the switch 121.

The voltage and current regulation of the AC-DC converter 110 in the open-loop and closed-loop control unit 112 can be implemented as cascaded regulation, in which the current regulator forms the inner regulation circuit and the voltage regulator the outer regulations circuit. With such an arrangement it is necessary that for a regulation of the DC voltage $U_{DC}$ of the converter 110, a current also flows at the DC output 111 of the converter 110. To ensure an adequately high current flow for a sufficiently accurate voltage regulation, the voltage balancing unit 120 contains an additional resistor or shunt R, which is connected in parallel to the first voltage detection unit 122 if the switch 121 is open. The resistor R has principally fulfilled its function as soon as the voltage balance U1=U2 has occurred and the switch 121 has been closed, i.e. as from the beginning of the actual charging or discharging process.

Ideally the resistor R should also be switched off then in order to avoid unnecessary losses over this resistor R during the charging or discharging process of the battery 200. Therefore a further switch 125 is provided for switching on and switching off the resistor R, which is coupled in opposition to the switch 121. I.e. the switch 125 is open when the switch 121 is closed and vice versa. Both switches can be actuated by one and the same switch drive 124. In such a case the switches 121 and 125 are combined in a load isolator, wherein the switch 121 is a power switch (closer) and the switch 125 is an auxiliary switch (opener).

As an alternative the switches 121 and 125 are embodied as separate switches with separate switch drives. In this case the switches are actuated as follows:
The switches 121 and 125 are opened and an electrical connection is made to the vehicle or to the battery.
U2 is detected in the plausible voltage range.
Switch 125 is closed.
AC-DC converter is regulated in voltage-regulated mode until U1=U2 applies.
Switch 121 is closed, then there is a short waiting period.
Switch 125 is opened, then there is a short waiting period.
Charging current or discharging current is ramped up to the nominal value.

Insulation monitoring 126 can additionally be provided between voltage balancing unit 120 and DC output terminal 102 of the DC charging station 100. This insulation monitoring is used for example in order to detect possible damage to the charging cable of the DC charging station 100.

Figure 3A:
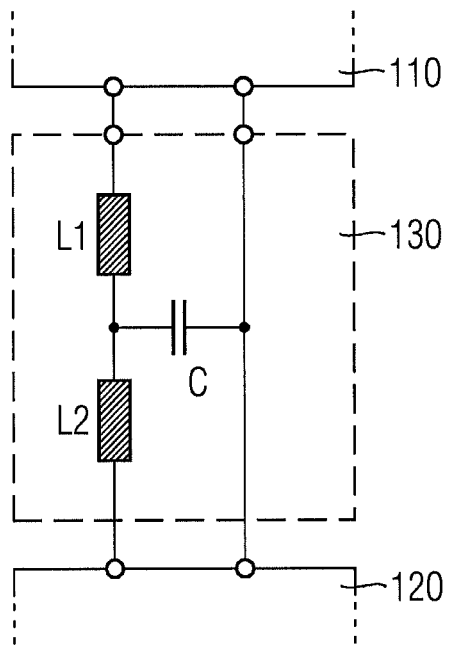
FIG. 3 shows two possible embodiments of an output filter.
Figure 3B:
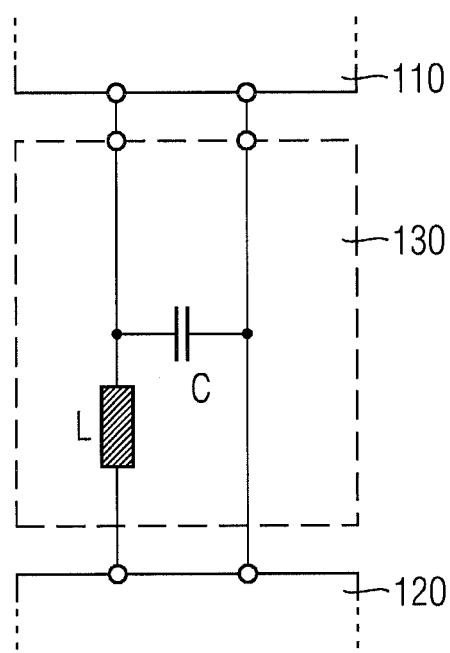

FIGS. 3A, 3B show two possible forms of realization of the output filter 130. The filter 130 may be realized as an LC-T filter with a capacitor C and two inductors L1, L2 (FIG. 3A) or alternatively as an LC filter with a capacitor C and one inductor L (FIG. 3B). The filters shown are integrated into the circuits of the charging station 100 such that the terminals shown at the top in the figures are connected to the AC-DC converter 110 (if necessary by the appropriate fuses) and the terminals shown at the bottom are connected to the voltage balancing unit 120.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A DC charging station for charging a battery of an electric vehicle, the DC charging station comprising:
   a DC voltage source with an output providing a DC voltage at least during operation of the DC charging station;
   a DC output terminal, to which the battery to be charged is able to be connected and connectable to the DC voltage source via at least one line, charging the battery during the operation of the DC charging station;
   a voltage balancing unit, connected between the output of the DC voltage source and the DC output terminal, the voltage balancing unit comprising:
      a first switch that selectably makes and breaks a connection between the output of the DC voltage source and the DC output terminal;
      a shunt resistor via which the input-side voltage is measured, and
      a second switch connected in series with the shunt resistor and controlled in opposition to the first switch,
   a first voltage detection unit, detecting an input-side voltage of the voltage balancing unit;
   a second voltage detection unit, detecting an output-side voltage of the voltage balancing unit; and
   a first open-loop and closed-loop control unit controlling and regulating the voltage balancing unit, to which measured values detected by the first and the second voltage detection unit are supplied, configured to:
      control the first switch to:
         break the connection between the output of the DC voltage source and the DC output terminal before and while the battery is connected to the DC output terminal, and
         make the connection between the output of the DC voltage source and the DC output terminal, at least to the battery connected to the DC output terminal, if the input-side voltage detected by the voltage balancing unit corresponds substantially to the output-side voltage detected by the voltage balancing unit; and
      control the second switch to:
         switch on the shunt resistor when the voltage balancing unit carries out the voltage balancing, and
         switch off the shunt resistor when the input-side voltage of the voltage balancing unit corresponds substantially to the output-side voltage of voltage balancing unit.

2. The DC charging station as claimed in claim 1, wherein the DC voltage source is a voltage-regulatable voltage source,
   wherein the DC charging station further comprises a second open-loop and closed-loop control unit, controlling and regulating the DC voltage source, configured to regulate the DC Serial No. 13/825,959 voltage source at least during operation of the DC charging station and at least for the battery connected to the DC output terminal so that the input-side voltage of the voltage balancing unit corresponds substantially to the output-side voltage.

3. The DC charging station as claimed in claim 2, wherein the second open loop and closed-loop control unit is a cascaded voltage and current regulation unit having a current regulator in an inner regulation circuit and a voltage regulator in an outer regulation circuit.

4. The DC charging station as claimed in claim 1, wherein insulation monitoring, provided at the output of the voltage balancing unit, detects damage to at least one of a charging cable and a charging socket on the vehicle and damage to the electrical connection to the battery in the vehicle.

5. The DC charging station as claimed in claim 4, wherein the DC voltage source is an AC-DC converter, having an input receiving an AC voltage, at least during operation of the DC charging station, and converting the AC voltage into the DC voltage available at the output of the DC charging station.

6. A method for charging a battery of an electric vehicle using a DC charging station with a DC voltage source, which makes a DC voltage available, at least in the operating state of the DC charging station, a DC output terminal to which the battery to be charged is able to be connected and connectable to the DC voltage source via at least one line, a voltage balancing unit connected between the output of the DC voltage source and the DC output terminal of the DC charging station and having a first switch controllable to make or break a connection between the output of the DC voltage source and the DC output terminal of the DC charging station, a shunt resistor via which the input-side voltage is measured, and a second switch connected in series with the shunt resistor and controlled in opposition to the first switch, said method comprising:
  breaking the connection between the output of the DC voltage source and the DC output terminal before and while the battery is connected to the DC output terminal;
  detecting the input-side voltage and the output-side voltage of the voltage balancing unit after the battery to be charged has been connected to the DC output terminal;
  controlling the first switch to make the connection between the output of the DC voltage source and the DC output terminal by the first switch only when the input-side voltage detected by the voltage balancing unit corresponds substantially to the output-side voltage detected by the voltage balancing unit; and
  controlling the second switch to switch on the shunt resistor when the voltage balancing unit carries out the voltage balancing, and switch off the shunt resistor when the input-side voltage of the voltage balancing unit corresponds substantially to the output-side voltage of voltage balancing unit.

7. The method as claimed in claim 6,
  wherein the DC voltage source is a voltage-regulatable voltage source, and
  wherein said method further comprises regulating the DC voltage source, at least during operation of the DC charging station and at least for the battery connected to the DC output terminal so that the input-side voltage of the voltage balancing unit corresponds substantially to the output-side voltage.

8. The method as claimed in claim 7, further comprising:
  initially breaking the connection between the output of the DC voltage source and the DC output terminal of the DC charging station before electrical connection of the battery to the DC charging station;
  determining the output-side voltage of the voltage balancing unit after the electrical connection has been made between the DC charging station and the battery;
  determining the input-side voltage of the voltage balancing unit;
  regulating the DC voltage available at the output of the DC voltage source so that the input-side voltage of the voltage balancing unit and the output-side voltage of voltage balancing unit substantially correspond prior to said making of the connection between the output of the DC voltage source and the DC output terminal of the DC charging station; and
  charging or discharging current ramped up to a nominal value.

9. The method as claimed in claim 8, further comprising waiting after making the connection between the output of the DC voltage source and the DC output terminal and before said charging or discharging.

10. The method as claimed in claim 9, wherein said determining of the input-side voltage includes measurement using a resistor, connected for measurement purposes by a second switch prior to said regulating.

11. The method as claimed in claim 10, further comprising disconnecting the resistor by opening the second switch after one of said making of the connection between the output of the DC voltage source and the DC output terminal and said waiting thereafter, and before said charging or discharging.

12. The method as claimed in claim 11, further comprising waiting after said disconnecting and before said charging or discharging.

13. The method as claimed in claim 8, wherein the first switch is externally controlled.

14. The DC charging station as claimed in claim 1, wherein the first switch is externally controlled.

15. A DC charging station for charging a battery of an electric vehicle, comprising:
  a DC voltage source with an output providing a DC voltage at least during operation of the DC charging station;
  a DC output terminal, to which the battery to be charged is able to be connected and connectable to the DC voltage source via at least one line, charging the battery during the operation of the DC charging station;
  a voltage balancing unit, connected between the output of the DC voltage source and the DC output terminal, having a first switch that selectably makes and breaks a connection between the output of the DC voltage source and the DC output terminal;
  a first voltage detection unit, detecting an input-side voltage of the voltage balancing unit;
  a second voltage detection unit, detecting an output-side voltage of the voltage balancing unit; and
  a first open-loop and closed-loop control unit controlling and regulating the voltage balancing unit, to which measured values detected by the first and the second voltage detection unit are supplied, configured to:
    open the first switch to break the connection between the output of the DC voltage source and the DC output terminal before the battery is connected to the DC output terminal,
    maintain the switch open during a physical connecting of the battery to the DC output terminal,
    after the battery is connected to the DC output terminal, receive from the voltage balancing unit an input-side voltage and output-side voltage detected by the first and second voltage detection units, respectively, after the battery is connected to the DC output terminal, and close the first switch to make the connection between the output of the DC voltage source and the DC output terminal if the input-side voltage detected by the voltage balancing unit after the battery is connected to the DC output terminal corresponds substantially to the output-side voltage detected by the voltage balancing unit after the battery is connected to the DC output terminal, such that connection of the battery to the DC voltage source occurs after connection of the battery to the DC output terminal, and is conditional upon a defined balance voltage condition.

* * * * *